(12) United States Patent
Meynard

(10) Patent No.: US 7,096,299 B2
(45) Date of Patent: Aug. 22, 2006

(54) METHOD AND APPARATUS FOR TRANSFERRING SYSTEM CONTEXT INFORMATION BETWEEN MOBILE COMPUTER AND BASE STATION

(75) Inventor: Olivier Meynard, Vizille (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

(21) Appl. No.: 10/706,042

(22) Filed: Nov. 13, 2003

(65) Prior Publication Data

US 2004/0199697 A1 Oct. 7, 2004

(30) Foreign Application Priority Data

Nov. 14, 2002 (EP) .................................. 02354175

(51) Int. Cl.
*G06F 13/00* (2006.01)
*G06F 9/44* (2006.01)
*H04B 7/00* (2006.01)
*H04B 7/185* (2006.01)
*H04Q 7/38* (2006.01)

(52) U.S. Cl. ........................ 710/304; 713/323; 361/683
(58) Field of Classification Search ........ 710/300–304, 710/104; 712/228; 713/1, 2, 100, 323; 361/683–686
See application file for complete search history.

(56) References Cited

U.S. PATENT DOCUMENTS

| | | | |
|---|---|---|---|
| 5,526,493 A | | 6/1996 | Shu |
| 5,671,366 A | | 9/1997 | Niwa et al. |
| 5,862,349 A | * | 1/1999 | Cho et al. .................... 710/304 |
| 5,864,708 A | * | 1/1999 | Croft et al. .................... 710/1 |
| 5,909,559 A | * | 6/1999 | So .............................. 710/307 |
| 6,105,119 A | * | 8/2000 | Kerr et al. ................... 711/219 |
| 6,456,487 B1 | * | 9/2002 | Hetterick .................... 361/683 |
| 6,549,968 B1 | * | 4/2003 | Hart .......................... 710/303 |
| 6,954,356 B1 | * | 10/2005 | Lam .......................... 361/683 |
| 2002/0157001 A1 | | 10/2002 | Huang et al. |

OTHER PUBLICATIONS

"Mobile agents: the next generation in distributed computing" by Gray et al. (abstract only) Publication Date:Mar. 17-21, 1997.*
"SWAN: a mobile multimedia wireless network" by Agrawal et al. (abstract only) Publication Date: Apr. 1996.*

* cited by examiner

*Primary Examiner*—Gopal C. Ray
(74) *Attorney, Agent, or Firm*—Foley & Lardner LLP

(57) ABSTRACT

A control element for a mobile computer and a base station operable to functionally interact with the mobile computer, the control device being operable to detect when a mobile computer is interacting with the base station, and cause the mobile computer to perform a transition from an operating state to a sleep state. The mobile computer saves system context information when performing the transition. The control element is operable to cause the base station to perform a transition to an operating state in accordance with the system context information.

7 Claims, 4 Drawing Sheets

METHOD AND APPARATUS FOR TRANSFERRING SYSTEM CONTEXT INFORMATION BETWEEN MOBILE COMPUTER AND BASE STATION

DESCRIPTION OF THE INVENTION

This invention relates to a mobile computer, a base station for a mobile computer, a control element and a method of operating a base station and a mobile computer.

BACKGROUND OF THE INVENTION

Mobile or portable computers, such as laptops or palmtops, are becoming increasingly popular in that they provide users with the capability to work or operate away from an office or other fixed location. The design of such mobile computers is of necessity a trade off between on the one hand the computing power, memory size and data storage capacity of the computer, and on the other hand weight and power consumption, to provide a computer which has sufficiently useful operating capacities but which may still be easily carried by a user and have a sufficient long battery life to be able to operate for a useful period away from a power source.

Conventionally, it is known to complement such mobile computers with a base station. The base station receives or otherwise functionally interacts with the mobile computer, and provides additional capabilities such as a power supply, a network connection, connection to a better display, access to a more powerful processor and so on.

This solution has however a number of disadvantages. When the user has a mobile computer for travelling and a conventional desktop for office use, the information held by the mobile computer and the desk top computer need to be synchronized. This requires installed software on each computer to be exactly the same and requires a careful synchronization mechanism such that appropriate data is stored on both computers when possible and is transferred from one computer to another when required. Conventionally, when the user docks the mobile computer and the base station, the user will have to close open applications on the mobile computer before operating desktop programs.

It is also known to provide a mobile computer which is responsive to its operating environment. For example, it is known to provide a mobile computer which increases its operating frequency when connected to a mains power supply, and when running on battery, reduces its operating frequency to extend the battery life. However, this technique has certain limitations. The range of frequencies is generally not very large so the mobile computer will not operate optimally in either state and is in any case dependent on other parameters such as the memory type, cache size and so on. The performance limitations on a computer also depend in part on the cooling capability of the computer, that is the possibility to cool the CPU. In a mobile computer, the room for providing cooling apparatus such as fans and heatsinks is relatively limited.

A third solution would be to purpose-build a very high power but light weight mobile computer, but such a solution would be particularly expensive.

An aim of the present invention is to provide a mobile computer and a base station where the mobile computer has maximum autonomy including relatively low power consumption and weight but correspondingly relatively low performance, and a base station which has a relatively high performance processor, with a simplified transition from the mobile computer to the base station.

SUMMARY OF THE INVENTION

According to a first aspect of the invention, we provide a control element for a mobile computer and a base station operable to functionally interact with the mobile computer, the control device being operable to
detect when a mobile computer is interacting with the base station, and cause the mobile computer to perform a transition from an operating state to another state, wherein the mobile computer saves system context information when performing the transition, and wherein the control element is operable to cause the base station to perform a transition to an operating state in accordance with the system context information.

The control element may cause the mobile computer to perform a transition from an operating state to another state by sending a transition request to an operating system of the mobile computer.

The control element may be operable to detect a transition-complete event generated by the operating system and cause the base station to perform a transition to an operating state in response to the transition-complete event.

The mobile computer may save system context information to a data storage medium provided on the mobile computer and the control element may be operable to copy the system context information from the mobile computer data storage medium to a base station data storage medium.

The control element may be operable to cause the base station to perform a transition to an operating state by sending a restore instruction to the base station to cause the base station to restore from the system context information.

The control element may be provided as a micro-controller.

According to a second aspect of the invention, we provide a mobile computer operable to functionally interact with a base station, the mobile computer being provided with a control element according to the first aspect of the invention.

According to a third aspect of the invention, we provide a base station operable to functionally interact with a mobile computer, the base station being provided with a control element according to the first aspect of the invention.

According to a fourth aspect of the invention, we provide a mobile computer operable to functionally interact with a base station, the mobile computer being operable to detect when the mobile computer is interacting with a base station and perform a transition from an operating state to another state,
wherein the mobile computer saves system context information when performing the transition, such that the system context information is retrievable by the base station.

The mobile computer may further comprise a local data storage medium wherein the system context information is saved to the local data storage medium.

The mobile computer may be operable to perform the transition in response to a transition request received by the mobile computer.

According to a fifth aspect of the invention, we provide a base station operable to interact with a mobile computer, the base station being operable to detect when a mobile computer is functionally interacting with the base station and perform a transition to an operating state, wherein the step of performing the transition comprises step of retrieving system context information saved by the mobile computer and performing the transition to an operating state in accordance with the system context information.

The base station may be operable to send a transition request to the mobile computer to cause the mobile computer to perform a transition from an operating state to another state and save system context information.

The base station may be operable to detect a transition-complete event of the mobile computer and perform a transition to an operating state in response to the transition-complete event.

Where the mobile computer saves the system context information to a local data storage medium provided on the mobile computer, the base station may read the local data storage medium to retrieve the system context information.

The base station may be operable to copy the system context information to a data storage medium of the base station prior to performing the transition to an operating state.

According to a sixth aspect of the invention, we provide a system comprising a mobile computer according to the fourth aspect of the invention and a base station according to the fifth aspect of the invention.

According to a seventh aspect of the invention, we provide a method of controlling a mobile computer comprising the steps of detecting when the mobile computer is functionally interacting with a base station and performing a transition from an operating state to another state, wherein the step of performing the transition comprises storing system context information such that the system context information is retrievable by the base station.

According to an eighth aspect of the invention, we provide a method of controlling a base station comprising the steps of detecting when a mobile computer is interacting with the base station and performing a transition to an operating state, wherein the step of performing the transition comprises the step of retrieving system context information saved by the mobile computer and performing the transition to an operating state in accordance with the system context information.

DESCRIPTION OF THE FIGURES

An embodiment of the present invention will now be described by way of example only with reference to the accompanying drawings, wherein.

DESCRIPTION OF THE PREFERRED EMBODIMENT

Figure 1:
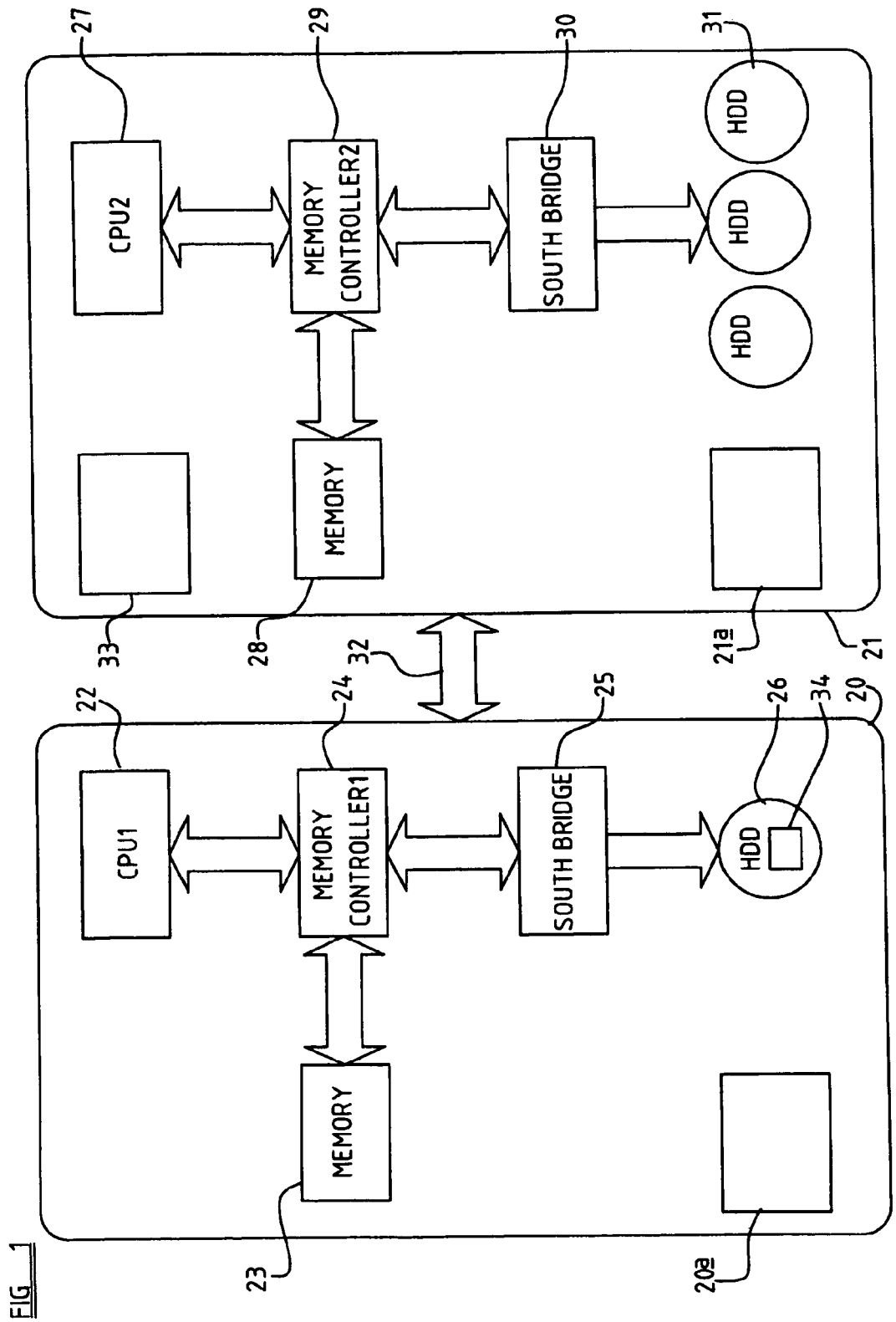
FIG. 1 is a diagrammatic illustration of a mobile computer and a base station embodying the present invention.

Referring now to FIG. 1, a mobile computer 20 and a base station 21 embodying the present invention are illustrated in diagrammatic form. The mobile computer comprises a processor ("CPU") 22, a memory 23, a memory controller 24, and a first south bridge 25 operable to pass data between the memory controller 24 and a local data storage medium 26, in the present example a hard disk drive. The base station similarly comprises a processor 27, a memory 28, a memory controller 29, a south bridge 30, and a base station data storage medium 31, in the present example comprising a group of hard disk drives. The mobile computer and the base station are operable to interact functionally as illustrated by arrows 32, for example through a physical connection or a wireless link, such as an infra-red or radio link.

The capacities of the mobile computer 20 and the base station 21 are selected to provide the desired characteristics required from each computer. So for example the processor 22 of the mobile computer 20 has a relatively low operating frequency and the memory 23 has a relatively low size, whereas the processor of the base station 21 has a higher operating frequency, provided with a larger memory 28, accessible using different memory technology, and in general provides a much more powerful computer system than the mobile computer 20. The mobile computer 20 is however designed to provide sufficient computing power for a mobile user.

In accordance with the present invention, the base station 21 is provided with a control element 33, in this case a micro-controller, which is operable to control the mobile computer 20 and the base station 21 when the mobile computer 20 and the base station 21 are functionally interacting to provide the most powerful computing environment to a user. Advantageously, this may be performed by causing one of the mobile computer and the base station to perform a transition from an operating state to another state, and in the transition performing the step of saving the system context information. The system context information comprises such information as the content of the memory 23, 28, the status of any operating programs, any status and condition of hardware components and any other appropriate information as might be required to define the operating state of the computer. The other of the mobile computer 20 or base station 21 is then caused to perform a transition to an operating state, and retrieve the stored system context information to restore to an operating state in accordance with the system context information. In both the mobile computer 20 and base station 21, the other state may be a comparatively inactive state where little or no processor activity occurs, for example a "sleep state" as discussed below in relation to an ACPI-compatible system.

Figure 2:
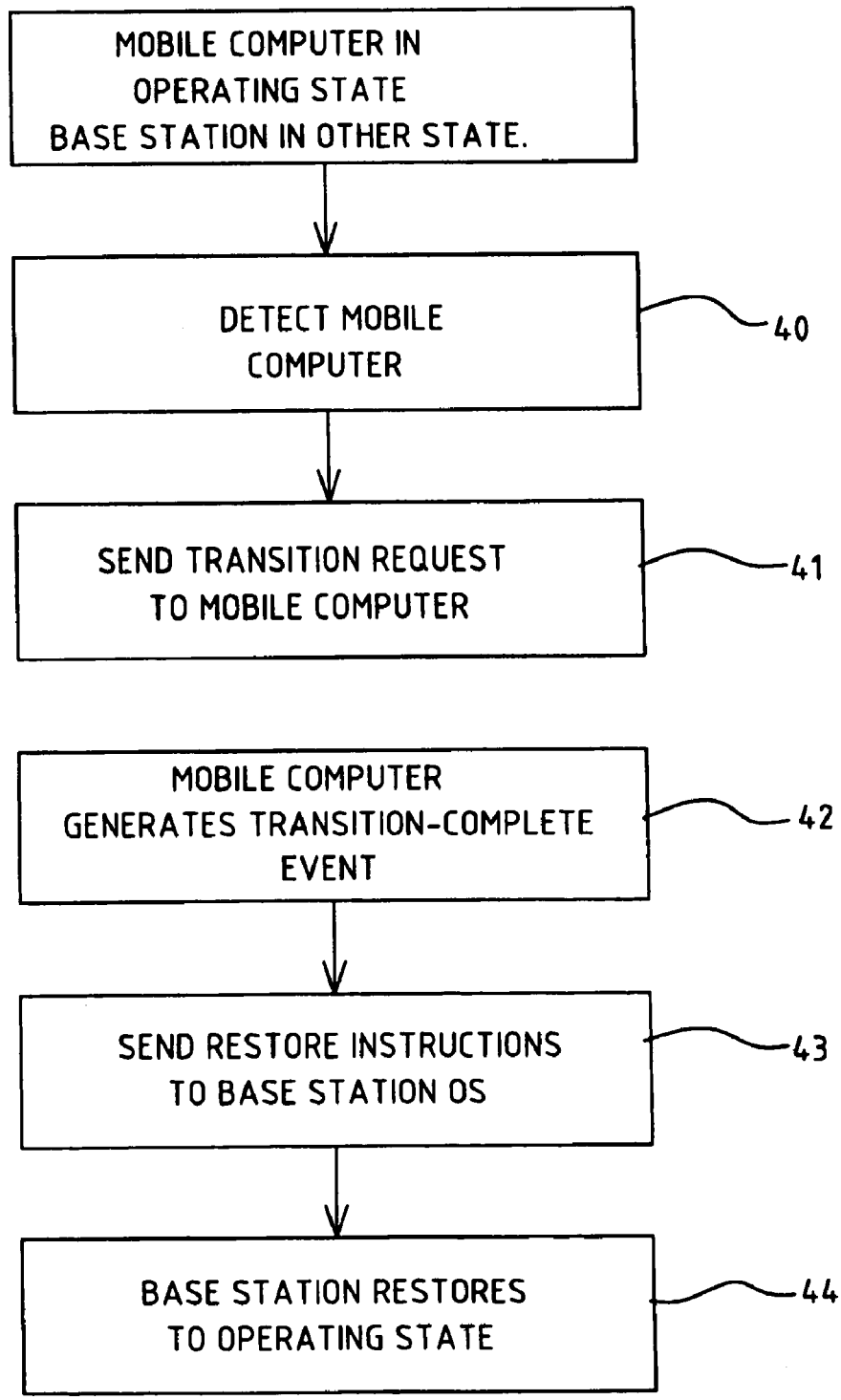
FIG. 2 is a flow diagram illustrating the operation of a control element according to the present invention.

The control element 33 operates as set out in FIG. 2. Initially, the base station 21 will be in a sleep state and the mobile computer 22 in an operating state. At step 40, the mobile computer is caused to interact with the base station 21, for example by physically connecting the mobile computer 20 and the base station 21 or by a wireless link or otherwise. The presence of the mobile computer 20 is detected by the control element 33. At step 41, the control element 33 will send a transition request to an operating system 20a of the mobile computer 20, that is a request to perform a transition from the operating state to another state. The operating system of the mobile computer 20 will then perform whatever steps are required to carry out this transition, for example powering-off devices, unloading drivers, closing down programs and copying the system context information to the hard disk drive 26. The control element will then wait for a transition-complete event indicating that the mobile computer has performed the transition. For example, when the shut down procedure is complete the operating system of the mobile computer 20 may generate a power off instruction which causes the mobile computer to shut down, that is perform the transition to a sleep state. At step 42, the control element 33 will detect this transition-complete event, and at step 43 send a restore instruction to an operating system 21a of the base station 21. The restore instruction will include information that the CPU 27 is to perform a transition from an appropriate state corresponding to that entered by the mobile computer 20. The operating system 21a of the base station 21 will then perform a restore process, retrieving the stored system context information from, for example, the hard disk drive 26 and performing a transition to the operating state defined by the system context information. Thus, to the user, the base station 21 will appear to seamlessly take over from the mobile computer 20, presenting the same operating environment to the user without the user having to, for example, shut down programs running on the mobile computer 20 itself.

In an alternative implementation, the control element 33 may be operable after step 42 to copy the system context information from the hard disk drive 26 to the hard disk drive 31. This may be particularly advantageous if the access time to the hard disk drive 31 is quicker, thus speeding up the restore process of the base station 21.

Although the data storage of the mobile computer 20 is a hard disk drive 26, it may alternatively be any other data storage medium as appropriate, such as a flash memory for any other data storage application as required.

The hardware components of the mobile computer 20 and base station 21 may be such that the mobile computer 20 or base station 21 can perform a transition to an operating state from the stored system context information without needing to take account of hardware differences. Where there are differences in hardware, these may advantageously be detected by using "Plug and Play" or PCI hot-plug compatible systems so that any differences in hardware are accommodated automatically. If necessary, of course, the control element may be operable to perform an adaptation phase, in which the hardware components of the restoring system are detected and appropriate instructions generated in accordance with the system context information but adapted to the detected hardware components.

When the user wishes to remove the mobile computer 20 from the base station 21, it will be apparent that the above process may simply be reversed. Thus, in response to a power-down or other suitable command from the user, for example, the control element 33 will cause the base station 21 to undergo a transition from the operating state to another state. As part of this transition, the base station 21 will save its system context, either directly to the hard disk drive 26 or to the hard disk drive 31 from where it may be copied by the control element 33 to the hard disk drive 26. The mobile computer 20, on performing a transition from its current state to its operating state, for example in response to the user touching a power button, will restore from the system context information saved by the base station 21.

The time taken for one of the mobile computer 20 and the base station 21 to pass from an operating state to a sleep state, and for the other of the mobile computer 20 and the base station 21 to perform a transition to an operating state is constrained mainly by the size of the file containing the system context information. With present computer systems this is related to the memory size of the computer in question, and so may take on the order of a minute or so to be transferred between the mobile computer 20 and the base station 21.

Figure 3:
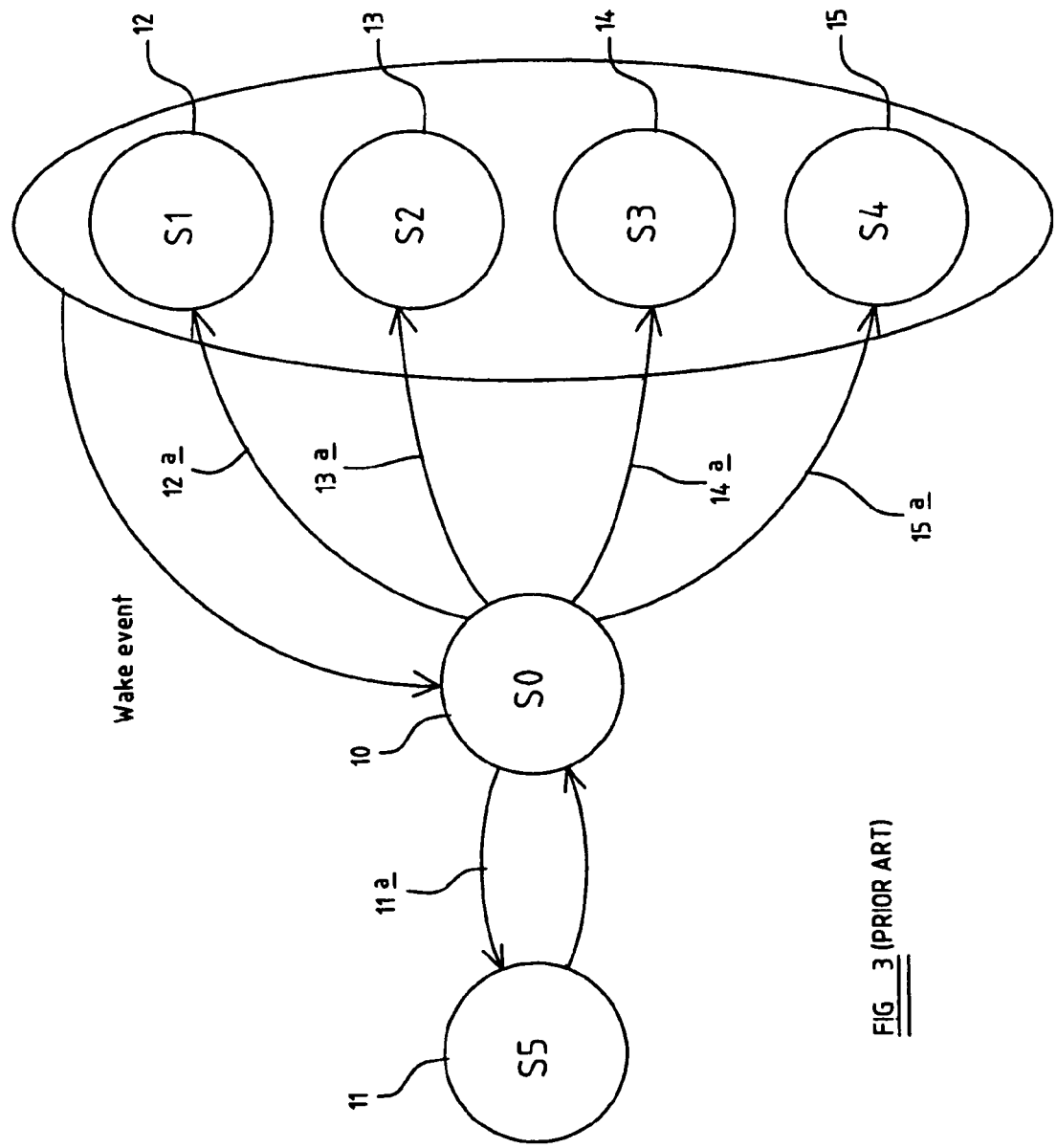
FIG. 3 is a diagram showing sleep states of a computer as defined by the ACPI specification.
Figure 4:
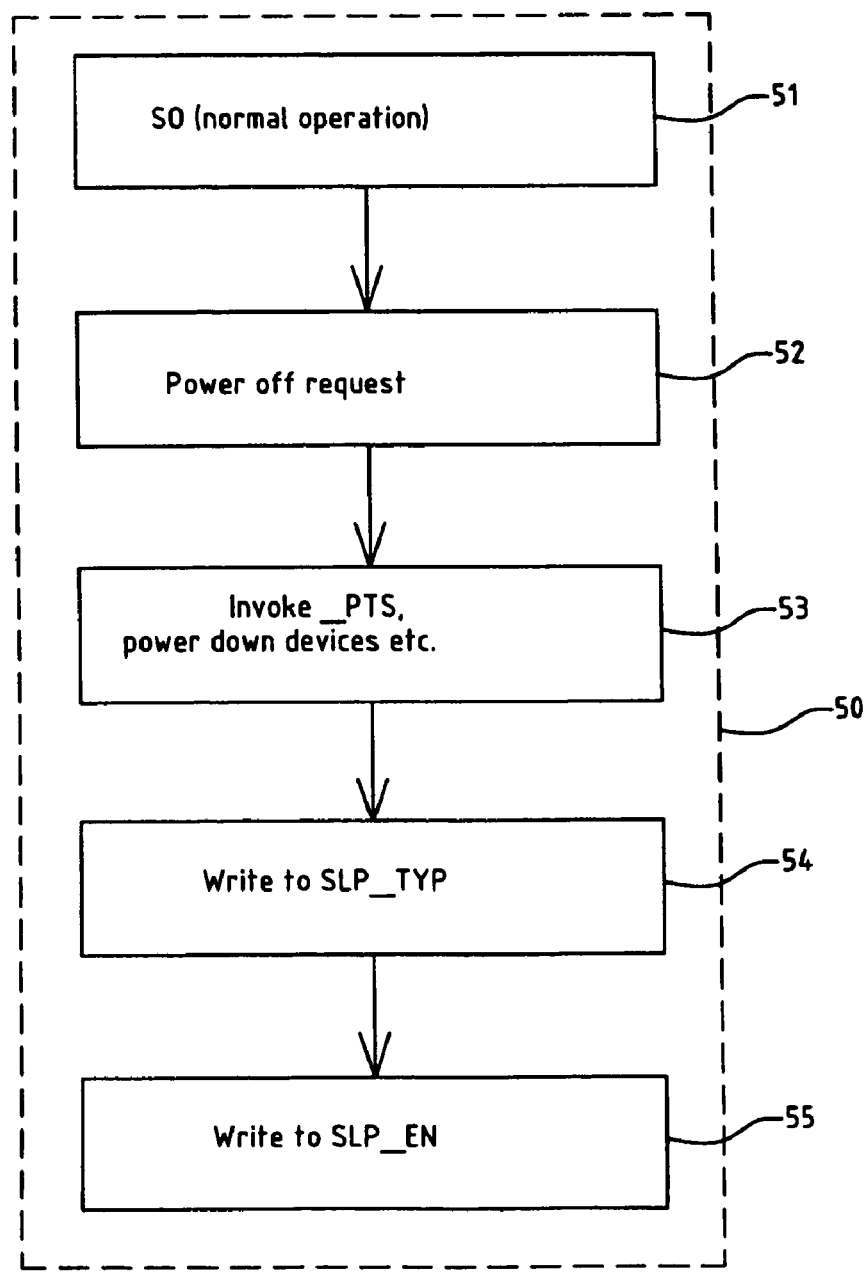
FIG. 4 is a diagrammatic illustration of the steps of performing a transition to a sleep state in accordance with the ACPI specification.

The present invention may advantageously be implemented for computers which are operable in accordance with the Advanced Configuration and Power Interface (ACPI) specification. In accordance with the ACPI specification, the operating system of a computer is able to cause transitions between a working state and a selected sleep state as illustrated in FIGS. 3 and 4. FIG. 3 shows the relationship between the operating state, the sleeping states and the 'soft off' state as set out in the ACPI specification, in which the operating state S0 is shown at 10, the S5 soft off state is shown at 11 and a plurality of sleeping states S1 to S4 are shown at 12, 13, 14, 15 respectively. The transitions between the S0 state 10, S5 state 11 and sleeping states S1 to S4 are shown by arrows 11a, 12a, 13a, 14a, 15a. To cause one of the transitions to occur, the operating system must write to a predefined register, in the present example the SLP_EN register, and it is this step of writing to the predefined register that provides a usable transition or restore instruction.

Where the computer is operable in accordance with the ACPI specification, the instruction may be detected as follows. As discussed above, the ACPI specification defines a plurality of sleep states, labelled as S1 to S5, which have progressively lower power requirements, where those states with the lowest power requirements have longer latency times, i.e. the time required to wake up the computer to an operating state. In the present example, the preferred transition is to state S4, otherwise referred to as "hibernation", in which the system context information is stored to disk.

Referring now to FIG. 4, the ACPI shutdown procedure is generally indicated at 50. At step 51, the computer is in state S0, the normal operating mode. At step 52 a power off request is received. At step 53, the operating system performs whatever steps are required, for example where necessary powering devices, unloading drivers, copying the system context to and invoking _PTS, the "prepare to sleep" instructions. At step 54, shutdown information comprising the required sleep state is written to the SLP_TYP register, in the present example as a three-bit number corresponding the number of the required sleep state. When shutdown is finally required, at step 55 the operating system then writes to the appropriate bit of the SLP_EN register to cause the shutdown.

In the current embodiment, it is preferred that the transition to a sleep state is the transition from S0 to S4, in which the CPU and RAM information is sent to the disk 26, in a bit-by-bit copy. Typically the "hibernate file" which contains the system context information will be about 512 megabytes and the rate of transfer from the mobile computer 20 to the base station 21 will be 10 to 30 megabytes per second. It will be apparent that the present embodiment may use a transition between S0 and S3, the "suspend to RAM" sleep state, but in this sleep state the system context information is not simply available from a single file as in the S4 sleep state, and so would require, for example direct copying from the memory 23 to the memory 28 or vice versa.

In accordance with the ACPI instruction, the control element 33 may generate the power off request issued to the operating system at step 52, and of the mobile compute 20 or base station 21 may detect the SLP_EN instruction at step 55 as a transition-complete event. The other of the mobile computer 20 or base station 21 may then be caused to "restore" using the system context information appropriately by generating a wake event.

It will be apparent that the control element 33 may be provided on either the mobile computer 20 or the base station 21 or be distributed or duplicated across both. It is advantageous to provide the control element 33 as an operating system-independent element, as it is desirable that the operating system element 33 be operable independently of the sleep state or operating state of the computer on which it is provided. Advantageously, it may be provided as a micro-controller which is operable independent of the CPU or other component of the relevant computer and may be implemented as desired, for example as a CMOS circuit or an ASIC or eprom or otherwise as may be appropriate.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A control element for a mobile computer and a base station operable to functionally interact with the mobile computer, the control element being operable to:

detect when the mobile computer is interacting with the base station by wireless communications between the mobile computer and the base station, with the mobile computer and the base station not being directly connected to each other, and cause the mobile computer to perform a transition from an operating state to another state, wherein the mobile computer saves system context information when performing the transition, and wherein the control element is operable to cause the base station to perform a transition to an operating state in accordance with the system context information, wherein the mobile computer is capable of entering one of a plurality of different sleep states, and wherein the system context information includes a numeric value indicating which of the plurality of sleep states the mobile computer has entered.

2. A control element according to claim 1 operable to cause the mobile computer to perform a transition from an operating state to the other state by sending a transition request to an operating system of the mobile computer.

3. A control element according to claim 2 operable to detect a transition-complete event generated by the operating system and cause the base station to perform a transition to an operating state in response to the transition.

4. A control element according to claim 1 wherein the mobile computer saves system context information to a data storage medium provided on the mobile computer and wherein the control element is operable to copy the system context information from the mobile computer data storage medium to a base station data storage medium.

5. A control element according to claim 1 wherein the control element is operable to cause the base station to perform a transition to an operating state by sending a restore instruction to the base station to cause the base station to restore to an operating state in accordance with the system context information.

6. A control element according to claim 1 wherein the control element is operable to cause the base station to perform the transition to the operating state in accordance with the system context information by retrieving the system context information from either a single stored file in the mobile computer or a plurality of stored files in the mobile computer, depending upon which of the plurality of different sleep states the mobile computer has entered.

7. A base station operable to functionally interact with a mobile computer, the base station being provided with a control element according to claim 1.

* * * * *